United States Patent
Nigg

[11] Patent Number: 6,102,638
[45] Date of Patent: Aug. 15, 2000

[54] PRE-ASSEMBLED STRUCTURAL PART AND FASTENER

[75] Inventor: Alexander Nigg, Altach, Austria

[73] Assignee: Alfit Aktiengesellschaft, Götzis, Austria

[21] Appl. No.: 09/274,786

[22] Filed: Mar. 23, 1999

[30] Foreign Application Priority Data

Apr. 14, 1998 [AU] Australia ................................. A632/98

[51] Int. Cl.⁷ .................................................. F16B 13/06
[52] U.S. Cl. .......................................... 411/80.1; 411/104
[58] Field of Search ............................... 411/84, 85, 104, 411/112, 55, 80.1, 80.5, 999

[56] References Cited

U.S. PATENT DOCUMENTS

| | | | |
|---|---|---|---|
| 3,180,660 | 4/1965 | Brewington | 411/104 |
| 3,319,918 | 5/1967 | Rapata | 411/55 |
| 3,846,851 | 11/1974 | Pepper | 411/84 |
| 4,263,833 | 4/1981 | Loudin | 411/55 |
| 4,662,808 | 5/1987 | Camilleri | 411/80.1 |
| 4,907,923 | 3/1990 | McGrath | 411/85 |
| 5,114,203 | 5/1992 | Carnes | 411/104 |
| 5,603,594 | 2/1997 | Lincoln | 411/104 |

FOREIGN PATENT DOCUMENTS 1127114  11/1984  Russian Federation .............. 411/80.1

*Primary Examiner*—Flemming Saether
*Attorney, Agent, or Firm*—Collard & Roe, P.C.

[57] ABSTRACT

In a fastening arrangement, where a relatively flat part (8) can be connected with a thicker part (9) by at least one screw (5) and an associated straddling dowel (1), in particular for fastening the front panel (9) or rear wall of drawers on flanges (8) of lateral frames, the flat part has an insertion hole (11, 12) for the straddling dowel (1) to be introduced up to a stop head (7) and to be inserted with its spreader (3) in an opening or blind hole (10) of the thicker part (9). To enable a pre-assembly, the straddling dowel (1) has a stepped neck (6) between its head (7) and the spreader portion (3) to be inserted in the opening (10) or blind hole, which neck has chamfers or a square profile on its outside for the fixed support on adapted countersurfaces (12, 13) of the insertion hole (11, 12).

1 Claim, 1 Drawing Sheet

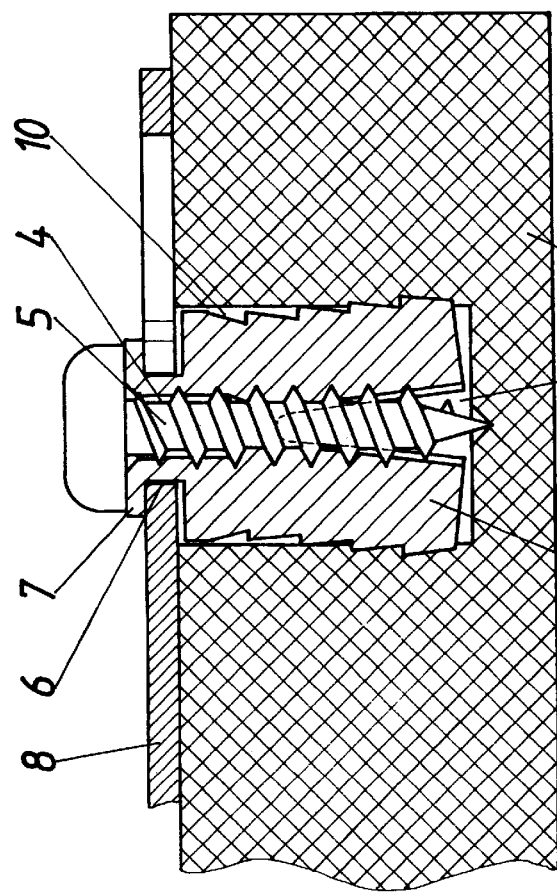
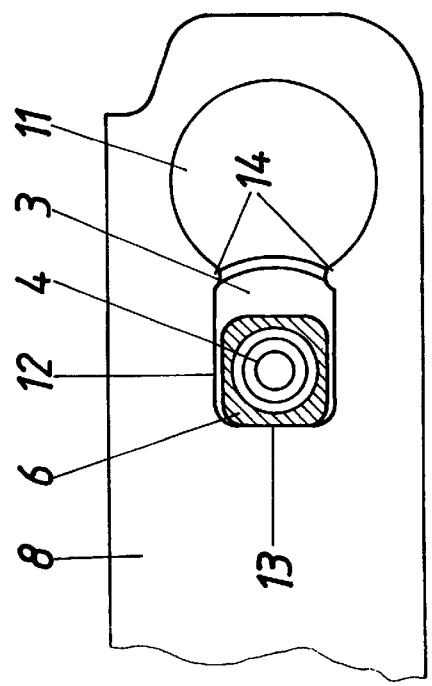
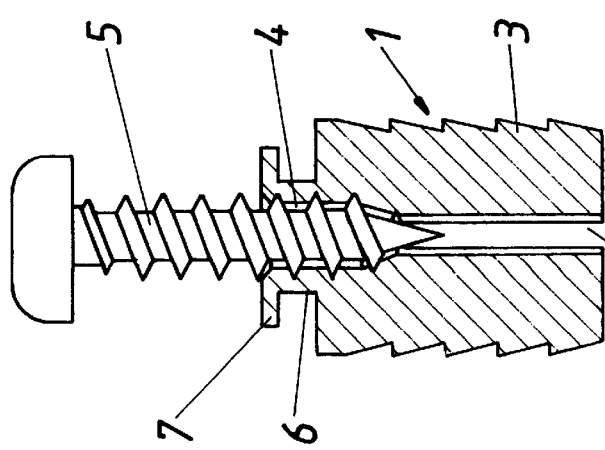

PRE-ASSEMBLED STRUCTURAL PART AND FASTENER

1. FIELD OF THE INVENTION

This invention relates to a fastening arrangement, wherein a relatively flat part can be connected with a thicker part by at least one screw and an associated straddling dowel, in particular for fastening the front panel or rear wall of drawers on flanges of lateral frames, where the flat part has an insertion hole for the straddling dowel, which can be introduced through the same up to a stop head and with its spreader can be inserted into an opening or blind hole of the thicker part.

2. DESCRIPTION OF THE PRIOR ART

Up to now, it has been necessary in such fastening arrangements to mount dowel and screw separately, where first of all the dowel is introduced and then the screw is tightened. The insertion hole is designed as round hole and mostly has the same diameter as the opening or blind hole. When fits are employed which are not quite close, there is a risk that the screw entrains the dowel when it is rotated, at least at the beginning of the tightening operation, so that a particularly high tool pressure must be applied onto the screw. Mounting dowel and screw can only be effected in connection with the final assembly, where due to the necessary manipulations the total period of the final assembly is considerably prolonged in an undesired way. For many assembly tasks it would be desirable to be able to use dowel and screw in a pre-assembled, i.e. slightly interengaged condition, where it is furthermore desirable that dowel and screw should already be mounted at the flat part, so that in the final assembly the dowel need only be introduced into the corresponding hole of the thicker part and then the screw must be tightened.

Accordingly, it is the object underlying the invention to create a fastening arrangement, wherein dowel and screw can be used in a pre-assembled condition and can separately be mounted at the flatter part, where in addition the dowel should have a protection against being rotated when the screw is tightened.

SUMMARY OF THE INVENTION

This object is solved in that between its head and the spreader to be inserted in the opening or blind hole, the straddling dowel has a stepped neck, which on the outside has chamfers or a square profile for the fixed support on adapted countersurfaces of the insertion hole.

Screw and dowel can already be pre-assembled and then be introduced into the insertion hole. In addition to the achievable protection against rotation a particularly durable connection can be achieved in that in the neck portion, too, the dowel can be designed so as to be spread or expanded or upset by means of the introducible or tightened screw, so that it is also clamped in the area of the through hole when the screw is tightened.

In accordance with an embodiment of the invention, a pre-assembly of the screw/dowel unit at the flatter part becomes easily possible in that the insertion hole is designed as an oblong hole extending from the edge of the flat part or has an oblong-hole portion, where proceeding from the edge of the flat part or after having been introduced, the neck portion of the dowel can be inserted with a cross-adjustment in a round hole portion completing the oblong hole in the manner of a keyhole and adapted to the spreader diameter of the dowel. The pre-assembly may be effected from that side of the flatter part from which the screw must be tightened. If in the case of special constructions the head portion of the dowel and also the screw head have a slightly smaller diameter than the spreader, the diameter of the round hole can also be adapted to the head portion diameter of screw or dowel, depending on which head is larger, i.e. can be chosen slightly smaller than the spreader diameter, where these parts are then passed through from the rear side of the flat part.

In accordance with an advantageous aspect of the preferred embodiment described herein there is provided between the round and oblong hole portion or at the open end of the insertion hole a narrow portion defined by contractions, which serves as an anti-loss protection.

Further details and advantages of the subject-matter of the invention can be taken from the following description of the drawing.

BRIEF DESCRIPTION OF THE DRAWING

In the drawing, the subject-matter of the invention is illustrated by way of example, wherein:

FIG. 1 represents a screw/dowel unit in the pre-assembled condition for the dowel represented in section, FIG. 2 represents the screw/dowel unit in accordance with FIG. 1 in the case of the assembly of a flat part on a thicker part, and FIG. 3 represents a top view as a detail of FIG. 2, where the screw was removed and the neck portion of the dowel was represented in section.

DESCRIPTION OF THE PREFERRED EMBODIMENT

The dowel 1 used in the fastening arrangement in accordance with FIGS. 1–3 is designed as straddling dowel and has a spreader 3 partly split up by slots 2 and an insertion hole 4 extending into this spreader 3 and into the slot portion 2 for a screw 5 whose effective diameter is chosen slightly larger than that of the insertion hole 4. At the upper end of the spreader 3 a stepped neck 6 is provided, which, as is in particular shown in FIG. 3, with a smaller diameter than the spreader 3 and a head portion 7 adjoining the neck 6 has a preferably square prismatic outer shape.

FIGS. 2 and 3 illustrate the fastening of a flat part 8, e.g. the mounting flange of the lateral frame of a drawer on a thicker part 9, e.g. on the front panel of a drawer, where in the thicker part 9 there is provided a blind hole 10 for accommodating the spreader 3 of the dowel. The flat part 8 has an insertion hole designed like a keyhole, which consists of a round hole 11, whose diameter corresponds to the diameter of the spreader 3, and an oblong hole 12, whose end 13 is flat, so that the three determinating sides of the oblong hole 12 in cooperation with three outer sides of the neck square in cross-section form a protection against rotation At the transition from the round hole 11 to the oblong hole 12 contractions 14 are provided, so that in this area the passage is slightly narrower than the square side length of the neck 6, and by means of the contractions 14, past which the neck 6 of the dowel 1 is snapped into the oblong hole portion 12, an anti-loss protection is obtained. Dowel 1 and screw 5 can thus be mounted in the oblong hole 12 of the part 8 in a pre-assembled condition, upon which part 8 is finally fastened on part 9 at any time by introducing the spreader 3 into the blind hole 10, and by tightening the screw 5, where also the neck portion 6 and the round head 7 of the dowel 1 are clamped against part 8, where the neck 6 is upset, so that it is clamped in the oblong hole 12. The neck portion 6 can also be designed such that it can be spread or expanded by tightening the screw.

What is claimed is:

1. A structural set consisting of a relatively flat structural part, a straddling dowel comprising a spreader, a head and a constricted neck portion connecting the head to the spreader, and a screw inserted in the straddling dowel for fastening the relatively flat structural part to a thicker structural part, the thicker structural part defining a hole for receiving the spreader, the relatively flat structural part defining a keyhole-shaped insertion hole for the straddling dowel, the insertion hole comprising a round hole portion, an oblong hole portion and a constriction between the round and oblong hole portions, the round hole portion having a diameter permitting the insertion of at least the head of the straddling dowel, the straddling dowel and the screw being pre-assembled and the neck portion having side walls extending parallel to the side walls of the oblong hole portion, the neck portion of the straddling dowel being held against rotation in the oblong hole portion and expanded upon tightening of the screw.

* * * * *

UNITED STATES PATENT AND TRADEMARK OFFICE
CERTIFICATE OF CORRECTION

PATENT NO. : 6,102,638
DATED : August 15, 2000
INVENTOR(S) : Alexander NIGG

It is certified that error appears in the above-identified patent and that said Letters Patent is hereby corrected as shown below:

On the title page, column 1, Item [30], please change to:

April 14, 1998     [AT]    Austria ............ A 632/98--

Signed and Sealed this

Seventeenth Day of April, 2001

*Attest:*

NICHOLAS P. GODICI

*Attesting Officer*     *Acting Director of the United States Patent and Trademark Office*